(12) United States Patent
Morinaga et al.

(10) Patent No.: US 9,038,495 B2
(45) Date of Patent: May 26, 2015

(54) STEERING APPARATUS FOR VEHICLE

(71) Applicants: Shinya Morinaga, Chiryu (JP); Makoto Toyoda, Kariya (JP)

(72) Inventors: Shinya Morinaga, Chiryu (JP); Makoto Toyoda, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 431 days.

(21) Appl. No.: 13/626,263

(22) Filed: Sep. 25, 2012

(65) Prior Publication Data

US 2013/0074640 A1 Mar. 28, 2013

(30) Foreign Application Priority Data

Sep. 26, 2011 (JP) .................................. 2011-208390

(51) Int. Cl.
*B62D 1/184* (2006.01)
*B62D 1/181* (2006.01)

(52) U.S. Cl.
CPC ........................................ *B62D 1/181* (2013.01)

(58) Field of Classification Search
CPC ........ B62D 1/181; B62D 1/187; B62D 1/195; B62D 1/18
USPC .............................. 74/492, 493; 280/775, 777
See application file for complete search history.

(56) References Cited

U.S. PATENT DOCUMENTS

| | | | | |
|---|---|---|---|---|
| 5,361,646 A * | 11/1994 | Venable | ............................ | 74/531 |
| 6,139,057 A * | 10/2000 | Olgren et al. | .................. | 280/775 |
| 6,276,719 B1 * | 8/2001 | Gartner | .......................... | 280/775 |
| 6,581,965 B2 * | 6/2003 | Lutz | ............................... | 280/775 |
| 7,147,375 B2 * | 12/2006 | Zernickel et al. | ............... | 384/49 |
| 7,275,458 B2 * | 10/2007 | Kinme et al. | ................. | 74/493 |
| 7,360,793 B2 * | 4/2008 | Hoshino et al. | ................ | 280/777 |
| 7,770,488 B2 * | 8/2010 | Kim et al. | ........................ | 74/493 |
| 8,887,596 B2 * | 11/2014 | Uesaka et al. | ................... | 74/493 |
| 2005/0066761 A1 | 3/2005 | Arihara | | |

FOREIGN PATENT DOCUMENTS

JP 2001-310741 A 11/2001
JP 2010-208588 A 9/2010

OTHER PUBLICATIONS

Extended European Search Report dated Jan. 30, 2013, issued by the European Patent Office in the corresponding European Application No. 12185839.3. (4 pages).

* cited by examiner

*Primary Examiner* — David M Fenstermacher
(74) *Attorney, Agent, or Firm* — Buchanan Ingersoll & Rooney PC

(57) ABSTRACT

A steering apparatus for a vehicle includes a main housing formed in a box form provided with a pair of side walls extending in an axial direction of the main housing with an opening between the pair of side walls, and provided with opening portions at opposing ends in the axial direction. The steering apparatus also includes a movable column member formed in a tubular form accommodated in the main housing through one of the opening portions at the opposing ends of the main housing in the axial direction. The steering apparatus further includes a resilient member, which is a plate spring, formed in one piece configured to fix to the main housing at the pair of fixing portions in a state where the pair of thrust portions, via thrust members, are thrusting the movable column member.

7 Claims, 7 Drawing Sheets

STEERING APPARATUS FOR VEHICLE

CROSS REFERENCE TO RELATED APPLICATIONS

This application is based on and claims priority under 35 U.S.C. §119 to Japanese Patent Application 2011-208390, filed on Sep. 26, 2011, the entire content of which is incorporated herein by reference.

TECHNICAL FIELD

This disclosure generally relates to a steering apparatus for a vehicle.

BACKGROUND DISCUSSION

Steering apparatuses have been provided with various countermeasures for preventing shakiness, or looseness, between column members connected with each other. In particular with the steering apparatuses configured to adjust an operation position of a steering wheel in a frontward and rearward direction of a vehicle, preventing shakiness between a fixed column member, which is retained to the vehicle, and a movable column member, which is movably supported and connected to the fixed column member, is considered most important. As an example, JP2010-208588A, hereinafter referred to as Reference 1, discloses an apparatus for enhancing rigidity of connection between members that connect with each other and providing a structure further restricting vibration for preventing shakiness in a steering column. The structure for preventing shakiness in the steering column disclosed in Reference 1 is the structure for preventing shakiness between an outer tube and an inner tube of the steering column, the outer tube and the inner tube of the steering column that rotatably supports a steering shaft and slidably fit relative to each other. The apparatus disclosed in Reference 1 includes a multiple number of through-holes formed on the outer tube provided with a separation distance between the through-holes in an axial direction of the outer tube. The apparatus disclosed in Reference 1 also includes thrust members, each of which fits to a corresponding through-hole in a state to be movable in a depth direction of the through-hole configured to thrust the inner tube, push nuts, each of which resiliently engages with an inner peripheral surface of the through-hole and restricts a movement of the thrust member in the opposite direction of the depth direction of the through-hole, and a biasing member that biases the thrust member in a direction toward the inner tube.

JP2001-310741A, hereinafter referred to as Reference 2, discloses a telescopic steering apparatus that provides a smooth telescopic movement with a simple configuration without generating a rotational movement of a movable bracket relative to a fixed bracket during a telescopic movement. The telescopic steering apparatus disclosed in Reference 2 includes a fixed bracket configured to be fixed to a vehicle body, a fixed shaft rotatably supported to the fixed bracket, a movable bracket fitted to the fixed bracket such that the movable bracket is slidable in an axial direction, a movable shaft connected to the fixed shaft such that the movable shaft is movable relative to the fixed shaft and configured to rotate integrally with the fixed shaft, the movable shaft rotatably supported to the movable bracket, and a movement mechanism that moves the movable bracket and the movable shaft in the axial direction relative to the fixed bracket and the fixed shaft. In the telescopic steering apparatus disclosed in Reference 2, an external peripheral portion of the movable bracket fitted to the fixed bracket is provided with at least one flat surface portion, and a contact member provided with a flat surface end portion that comes in contact with the flat surface portion is retained to the fixed bracket.

The outer tube and the inner tube described in Reference 1 correspond to the aforementioned fixed column member and the aforementioned movable column member, respectively. The fixed bracket and the movable bracket described in Reference 2 correspond to the aforementioned fixed column member and the aforementioned movable column member, respectively. In Reference 2, the fixed bracket includes a steering column and a lower tube, and the movable bracket includes a telescopic tube and an upper tube. Each of the members corresponding to the fixed column member and the movable column member in each of Reference 1 and Reference 2 is a tubular member either forming an outer tube or an inner tube. In each of Reference 1 and Reference 2, a thrust member is provided such that the thrust member applies thrust on an inner tube through a through-hole formed on an outer tube in order to prevent shakiness between the inner tube and the outer tube. Components used in Reference 1 more specifically are push nuts and biasing members, for example a plate springs or coned disc springs. Components used in Reference 2 more specifically are coned disc springs, a spacer, a snap ring, and bushes.

More specifically, the fixed column member serving as an outer tube of the steering apparatus in Reference 1 is the outer tube formed in a tubular form. Similarly, the fixed column member serving as an outer tube of the steering apparatus in Reference 2 is the fixing bracket that includes the steering column and the lower tube, each of which is formed in a tubular form. In other words, each of the components that serves as the outer tube of the steering apparatus in Reference 1 and Reference 2 is a component formed in the tubular form. The outer tube of the steering apparatus formed in the tubular form results in restrictions for the structure that prevents shakiness between the fixed column member serving as an outer tube, and the movable column member serving as an inner tube, which leads to an increase in number of components. For example, in Reference 1, push nuts and a multiple number of coned disc springs are provided in addition to thrust members. In addition to the increase in number of components, thrust members and push nuts make an assembly process difficult. In Reference 2, in addition to a multiple number of coned disc springs, a snap ring for fixing the coned disc springs to the outer tube is provided. In addition to the increase in number of components, the assembly process becomes difficult. Hereinafter, for a convenience of describing a steering apparatus for a vehicle in this disclosure more clearly, a main housing is the term used for the component corresponding to the fixed column member, in order to avoid confusion.

A need thus exists for a steering apparatus for a vehicle, which is not susceptible to the drawback mentioned above.

SUMMARY

According to an aspect of this disclosure, a steering apparatus for a vehicle configured to adjust an operation position of a steering wheel at least in a frontward and rearward direction of a vehicle body includes a main housing formed in a box form retained to the vehicle body, provided with a pair of side walls extending in an axial direction of the main housing with an opening between the pair of side walls, and provided with opening portions at opposing ends in the axial direction. The steering apparatus also includes, a movable column member formed in a tubular form movably supported by the main housing to be movable in the axial direction relative to the main housing, the movable column member accommodated in the main housing through one of the opening portions at the opposing ends of the main housing in the axial direction, the movable column member being connected to the steering wheel. The steering apparatus further includes a resilient member formed in one piece provided with a pair of thrust portions thrusting the movable column member at positions separated by a predetermined separation distance in the axial direction and with a pair of fixing portions fixing to end surfaces of the pair of side walls at positions between the pair of thrust portions in the axial direction. The resilient member configured to fix to the main housing at the pair of fixing portions is in a state where the pair of thrust portions are thrusting the movable column member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A steering apparatus for a vehicle according to a first embodiment will be described as follows referring to drawings. FIGS. 1 through 5 illustrate the steering apparatus for the vehicle according to the first embodiment. The steering apparatus for the vehicle according to the first embodiment includes a steering shaft 1, which includes an upper shaft 1a formed in a tubular form and a lower shaft 1b formed in a tubular form. A steering wheel 100 connects with a rear end portion of the upper shaft 1a. The lower shaft 1b is spline-fitted to a front end portion of the upper shaft 1a. In other words, the upper shaft 1a and the lower shaft 1b are connected such that the upper shaft 1a and the lower shaft 1b may move relative to each other in an axial direction. A front end portion of the lower shaft 1b connects with a steering mechanism. The steering mechanism is driven to steer vehicle wheels via a vehicle wheel steering mechanism in response to an operation of the steering wheel 100.

Figure 1:
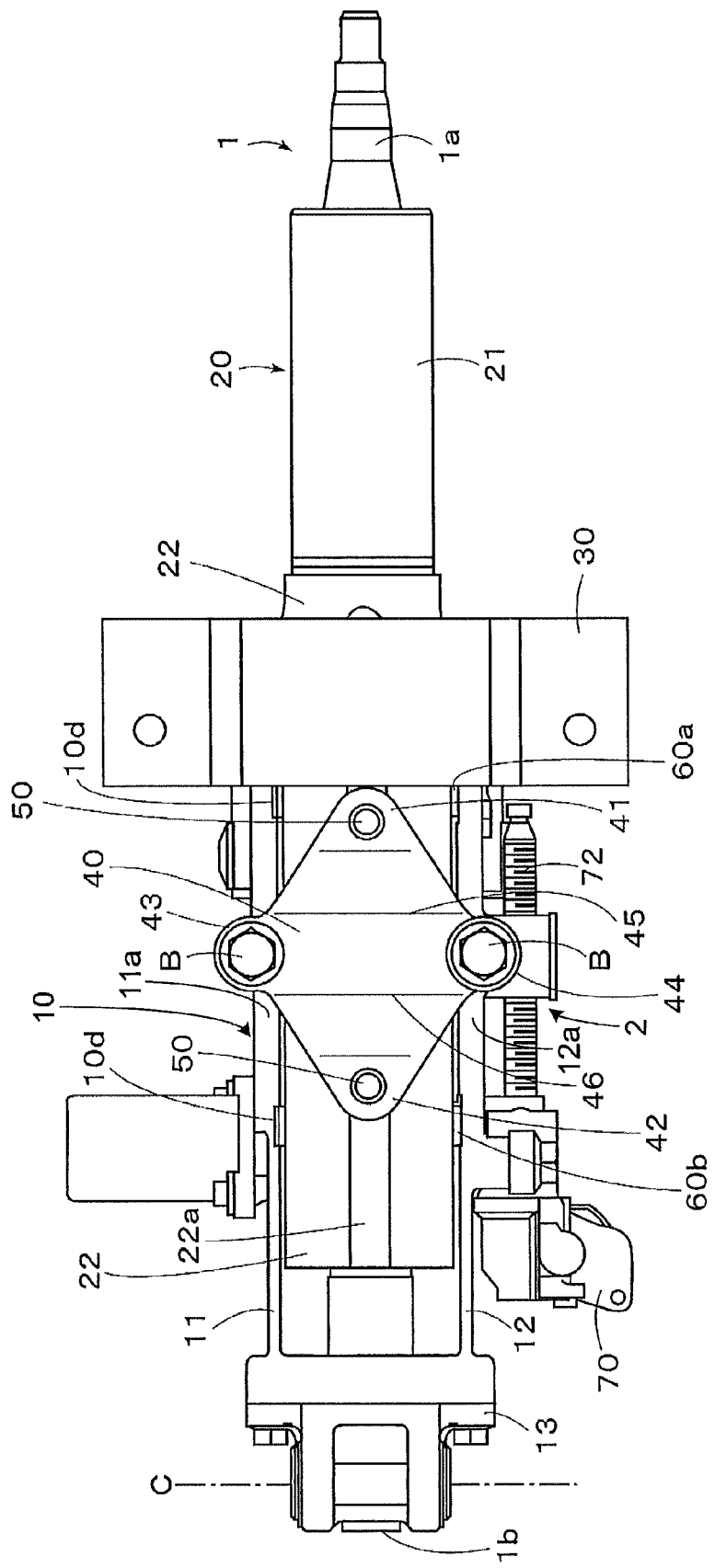
FIG. 1 is a top view of a steering apparatus for a vehicle according to a first embodiment.
Figure 2:
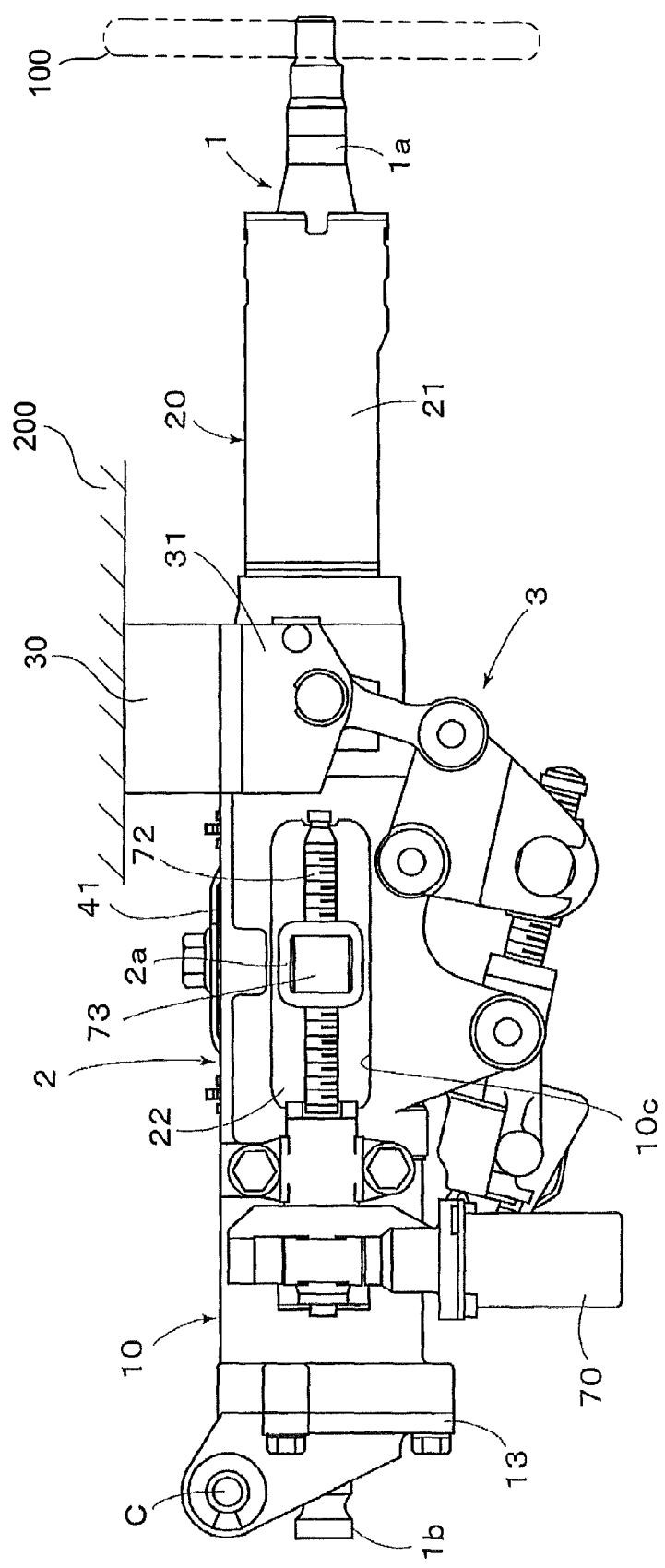
FIG. 2 is a side view of the steering apparatus according to the first embodiment.

A main housing 10 is coaxially arranged with the steering shaft 1. The main housing 10 is retained by a fixing bracket 30. At the same time, the main housing 10 is retained at a pivoting center C such that the main housing 10 is pivotable relative to a vehicle body 200. The fixing bracket 30 includes a pair of retaining portions 31 opposing each other extending in a downward direction of the vehicle. In FIG. 2, one of the retaining portions 31 is illustrated. The main housing 10 is retained between the pair of retaining portions 31 so that the main housing 10 is fixed to the vehicle body 200 in a vertical direction from the surface of the drawing in FIG. 1. A thrust mechanism is placed between each of the retaining portions 31 of the fixing bracket 30 and the main housing 10. With the thrust applied by the thrust mechanism, the main housing 10 is slidably supported to the fixing bracket 30.

Figure 3:
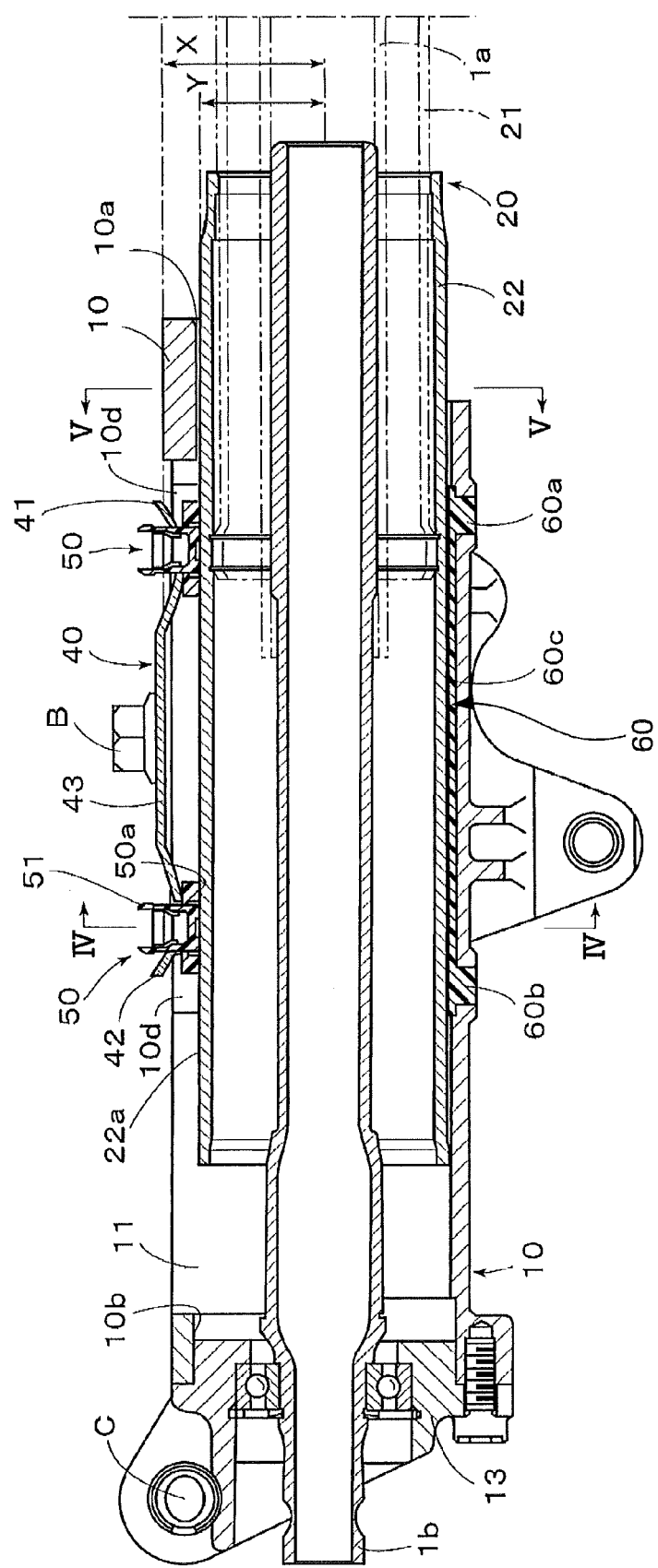
FIG. 3 is a cross-sectional view of the steering apparatus according to the first embodiment viewed from the side.

Within the main housing 10, a movable column member 20 is retained such that the movable column member 20 may move in the axial direction, which is the direction in a frontward and rearward direction of the vehicle body 200. The movable column member 20 includes an inner tube 21 made of metal and an outer tube 22 made of metal. The inner tube 21 accommodates the steering shaft 1 and retains the steering shaft 1 such that the steering shaft 1 may rotate at the axis. The outer tube 22 accommodates the inner tube 21. In an ordinary situation, the outer tube 22 retains the inner tube 21 at a predetermined position. The inner tube 21 is also referred to as an upper tube. The outer tube 22 is also referred to as a telescopic tube. The upper shaft 1a, which is illustrated in dashed-two dotted lines in FIG. 3, is rotatably supported to a rear end portion of the inner tube 21 via a bearing. A relative movement in the axial direction between the upper shaft 1a and the inner tube 21 is restricted. Accordingly, the upper shaft 1a and the inner tube 21 are configured to move integrally in the axial direction.

A telescopic mechanism 2 is configured such that the outer tube 22, the inner tube 21, the steering shaft 1, and the steering wheel 100 may move integrally in the axial direction relative to the main housing 10, so that the steering wheel 100 is adjusted to an intended position in the frontward and rearward direction of the vehicle body 200. The telescopic mechanism 2 is configured to allow a relative movement of the inner tube 21, accordingly a relative movement of the upper shaft 1a, in the axial direction relative to the outer tube 22 in a case where the steering shaft 1 is applied with a load equal to or more than a predetermined value. In other words, the inner tube 21 and the outer tube 22 function as an energy absorbing means together with an annular frictional member, for example, a resilient bush made of metal, placed between the inner tube 21 and the outer tube 22.

Figure 4:
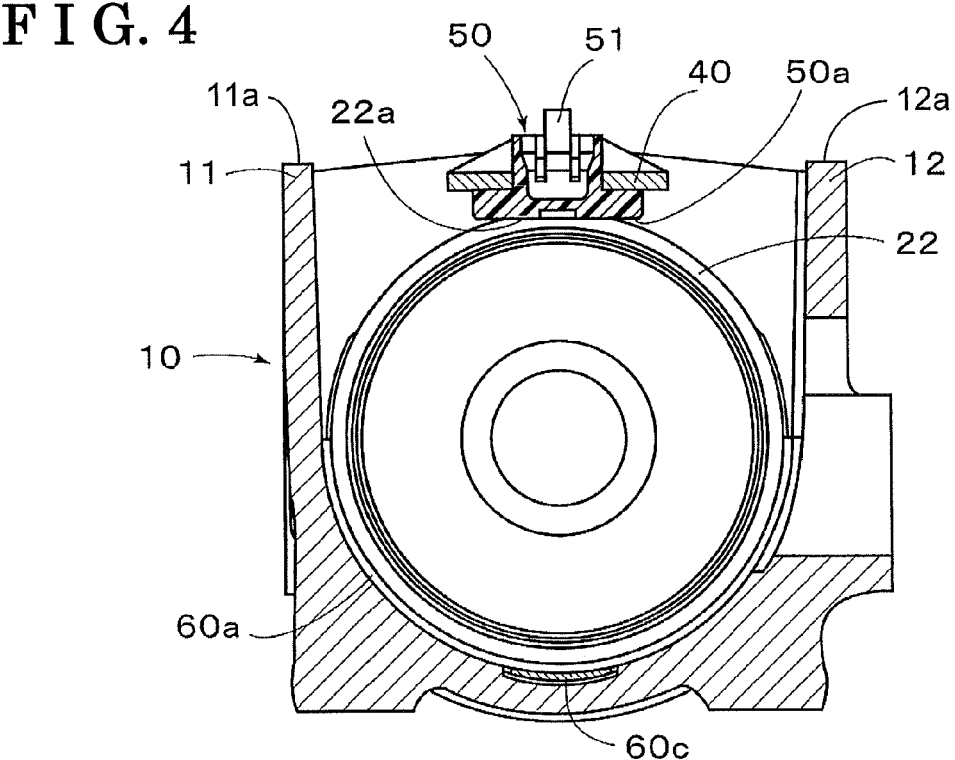
FIG. 4 is a cross-sectional view of the steering apparatus according to the first embodiment taken along line IV-IV in FIG. 3.

The main housing 10 of the steering apparatus according to the first embodiment is formed in a substantially box form made by metal die-cast. The metal used for the die-cast, for example, is aluminum. As FIGS. 1 through 3 illustrate, the main housing 10 is provided with a pair of side walls 11, 12 extending in the axial direction. The side walls 11, 12 are provided with an opening therebetween in an upward direction of the vehicle body 200. At the same time, the main housing 10 is provided with opening portions 10a, 10b at opposing ends in the axial direction. The main housing 10 is provided with a larger size between the side walls 11, 12 relative to the diameter of the outer tube 22 that constitutes the movable column member 20. An inner wall of the main housing 10 is provided with a curved surface fitting the exterior surface of the movable column member 20. As FIG. 4 illustrates, the main housing 10 is provided with a cross-sectional shape obtained in a direction perpendicular to the axial direction, the cross-sectional shape in a U-shape while including the pair of side walls 11, 12. The main housing 10 is formed in a box form provided with the side walls 11, 12 extending in the axial direction with the opening therebetween in the upward direction, which is the direction upward in FIG. 4. Accordingly, the main housing 10 may be manufactured without difficulty with an aluminum die-cast, or a similar manufacturing method. As a result, the main housing 10 may be provided with an intended form to the inner surface without difficulty in a manufacturing process. In other words, the inner surface having a curved surface fitting the exterior surface of the outer tube 22 may be provided without difficulty. The outer tube 22, which is made of metal, is formed in a tubular form. The outer tube 22 is formed with a flat surface portion 22a, which serves as a first flat surface portion, extending in the axial direction on the exterior surface of the outer tube 22. A plate spring 40 in one piece, the plate spring 40 that serves as a resilient member, is retained to the main housing 10 in a state such that the plate spring 40 is thrusting, or pressing, the flat surface portion 22a of the outer tube 22. As FIG. 3 illustrates, the outer tube 22 of the steering apparatus according to the first embodiment is accommodated in the main housing 10 through the opening portion 10b, which is the opening portion provided in the frontward direction of the vehicle body 200. The opening portion 10b is provided with a bearing 13, as shown in FIG. 2 for example, which rotatably supports the lower shaft 1b.

As FIGS. 1 through 3 illustrate, the plate spring 40 of the steering apparatus according to the first embodiment is a plate form spring member in one piece provided with a pair of thrust portions 41, 42 thrusting the flat surface portion 22a of the outer tube 22 at positions separated by a predetermined distance in the axial direction and with a pair of fixing portions 43, 44 fixing to end surfaces 11a, 12a on the pair of side walls 11, 12 at positions between the pair of thrust portions 41, 42 in the axial direction. As FIG. 1 illustrates, a bent portion 45 is formed between the fixing portions 43, 44 and one of the thrust portions 41, 42, specifically, the thrust portion 41. Another bent portion 46 is formed between the fixing portions 43, 44 and the other one of the thrust portions 41, 42, specifically, the thrust portion 42. As FIG. 3 illustrates, a level difference is formed between surfaces, each of which provided with the thrust portion 41, 42, and a surface provided with the fixing portions 43, 44. The thrust portions 41, 42 of the plate spring 40 are arranged such that the thrust portions 41, 42 of the plate spring 40 are thrusting the flat surface portion 22a of the outer tube 22, and then the plate spring 40 is fixed to the main housing 10 at the fixing portions 43, 44 with bolts B so that an intended thrust force is applied to the outer tube 22. The method for fixing the plate spring 40 to the main housing 10 is not limited to fixing with bolts. The plate spring 40 may be fixed to the main housing 10 with rivets, or by press fitting pins, or by a similar method that may fix the plate spring 40 securely to the main housing 10.

Each of the thrust portions 41, 42 of the plate spring 40 of the steering apparatus according to the first embodiment is formed with a through-hole where the thrust member 50 is attached. Each of the thrust members 50, which is made of a synthetic resin is attached to the through-hole corresponding to each of the thrust members 50 such that a small clearance is available at the though-hole around each of the thrust members 50. At the thrust portions 41, 42, the flat surface portion 22a of the outer tube 22 is applied with thrusts via the thrust members 50. Each of the thrust members 50 of the steering apparatus according to the first embodiment is in a tubular form having a bottom surface. The bottom surface, as FIGS. 3 and 4 illustrate, is a flat surface portion 50a, which serves as a second flat surface portion. The flat surface portion 50a contacts the flat surface portion 22a of the outer tube 22. Each of the thrust members 50 is formed with projections 51 at an end for engaging the thrust member 50 with the plate spring 40. In a case where the thrust member 50 is inserted to the corresponding through-hole extending through the plate spring 40, the projections 51 engage with the plate spring 40 such that the thrust member 50 is retained in a floating support state, so that the flat surface portion 50a of the thrust member 50 constantly makes plane contact with the flat surface portion 22a of the outer tube independently of a resilient deformation of the plate spring 40.

Each portion of the plate springs 40 that contacts the thrust member 50 is curved in an arc-like form such that a peak portion, or a tangent point, of the arc-like form substantially coincides with the center of the thrust member 50 in a state where the plate spring 40 is deformed with the compression provided for assembling the plate spring 40. Upon arrangement described herewith, a contact state of the plate spring 40 and the thrust member 50 is prevented from being in a point contact. Each of the thrust members 50 receives the load from the plate spring 40 in the center of the thrust member 50, so that a uniform thrust may be provided on the entire contact plane where the thrust member 50 and the outer tube 22 contact.

As in FIGS. 1 and 3, recesses 10d are formed on the inner wall of the main housing 10. The recesses 10d are provided at positions separated from each other by a predetermined distance in the axial direction. Bushes 60a, 60b, each of which is a portion of a bearing member 60, fit to the recesses 10d. As FIGS. 3 and 4 illustrate, the bearing member 60 of the steering apparatus according to the first embodiment is a component made of a synthetic resin. The bearing member 60 includes bushes 60a, 60b, each of which is formed in a semicircle, or in other words in a U-form, connected by a plate form portion 60c. The bushes 60a, 60b and the plate form portion 60c are integrally formed, however, the bushes 60a, 60b may be formed as separate parts. The outer tube 22, which is movable in the axial direction relative to the main housing 10, may slide smoothly by the intermediary of the bushes 60a, 60b. The sliding surface of the bearing member 60 relative to the outer tube 22 is provided on the side opposite to the side where the thrust members 50 are provided. The sliding surface may or may not be provided for the entire circumference of the outer tube 22. A difference between an inner diameter of each of the bushes 60a, 60b and an outer diameter of the outer tube, which is a clearance therebetween, is defined such that the clearance does not provide shakiness, or looseness, between the main housing 10 and the outer tube 22.

Figure 5:
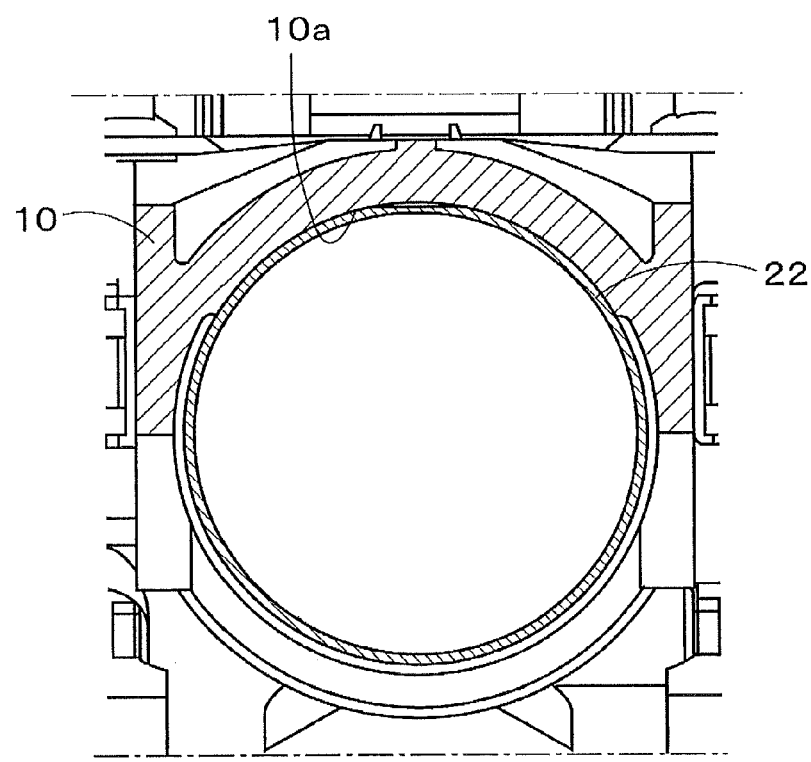
FIG. 5 is a cross-sectional view of the steering apparatus according to the first embodiment taken along line V-V in FIG. 3.

As FIGS. 3 and 5 illustrate, a clearance provided between an inner diameter of an opening portion 10a, which is provided at the main housing 10 in a rearward direction of the vehicle body 200, and an outer diameter of the outer tube 22 is defined such that the clearance does not provide a shaky feeling to a driver in a case where the driver applies a load to the steering wheel 100. Such clearance is defined in the direction in which the thrust members 50 are provided. In directions other than the direction in which the thrust members 50 are provided, the clearance may be larger. In a case where the bushes 60a, 60b support a whole periphery of the outer tube 22, a difference between the inner diameter of the bushes 60a, 60b and the outer diameter of the outer tube 22 may be defined so that the clearance in the whole peripheral direction becomes equal to the aforementioned clearance provided in the direction in which the thrust members 50 are provided.

In other words, the clearance between the inner diameter of the opening portion 10a, which is provided at the main housing 10 in the rearward direction of the vehicle body 200, and the outer tube 22 is defined to a value less than or equal to a predetermined threshold value in an upward direction of the vehicle body 200. An upper limit of the threshold value corresponds to the size of the clearance that starts providing the driver with the shaky feeling when the driver applies the load in the upward direction of the vehicle body 200 to the steering wheel 100. The outer tube 22 is biased in a downward direction of the vehicle body 200 with a biasing force of the plate spring 40. In a state where a force applied by the driver to the steering wheel 100 in an upward direction of the steering wheel 100 becomes larger than the load provided by the plate spring 40 in the assembled state, the outer tube 22 may move in the upward direction by deforming the plate spring 40, however, the driver does not feel such movement as shaky in a case where the movement is very slight.

Figure 6:
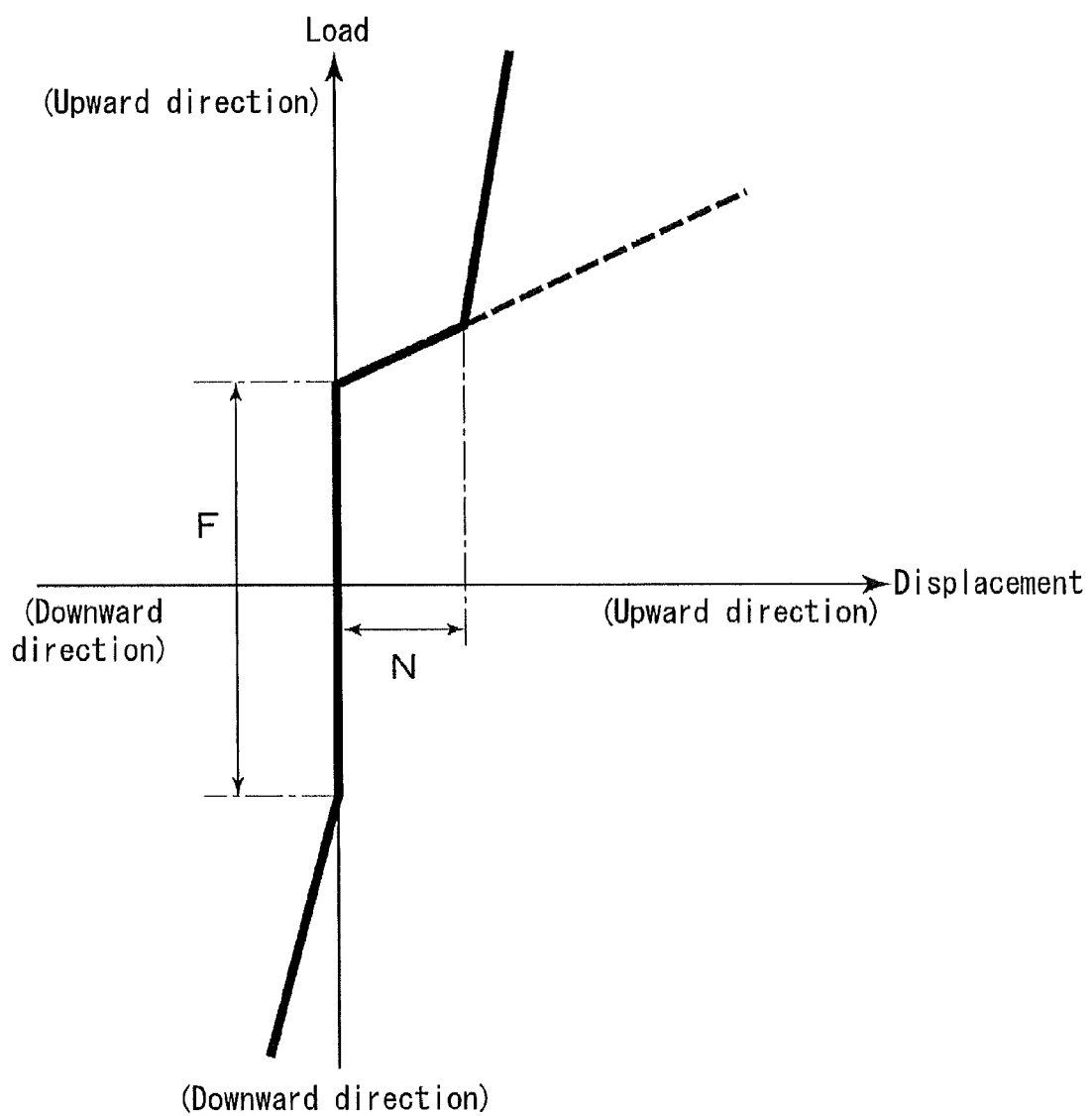
FIG. 6 is a graph illustrating a characteristic between a displacement of a plate spring and a load for the steering apparatus according to the first embodiment.

In a state where the clearance in the upward direction of the vehicle body 200 is equal to or less than 0, sliding resistance of the outer tube 22 relative to the main housing 10 during a telescopic operation becomes large. The sliding resistance interferes with the telescopic operation and may cause generating an abnormal noise. Considering that resulting size of components may vary in manufacturing, the inner diameter of the main housing 10 and the outer diameter of the outer tube 22 are defined so that the minimum value for the clearance therebetween is larger than 0, and the maximum value for the clearance therebetween is smaller than the threshold value. In a case where the outer tube 22 moves upward to a distance equal to the clearance provided thereof, the outer tube 22 contacts the opening portion 10a of the main housing 10 and a rigidity as a steering column increases greatly relative to the input at the steering wheel 100. FIG. 6 illustrates a relationship between the input at the steering wheel 100 and the rigidity described with a graph illustrating a characteristic between a displacement of the plate spring 40 and a load applied to the steering wheel 100. In a case where an input at the steering wheel 100 applied in the upward direction of the vehicle body 200 exceeds a preset load F for the plate spring 40, the outer tube 22 contacts the opening portion 10a of the main housing 10 having high rigidity so that a movement of the outer tube 22 is restricted and retains the steering wheel 100 within a range N where the driver does not feel the shaky feeling. Accordingly, the driver is avoided from experiencing the range that overly exceeds the range N, the range where the driver feels the shaky feeling in the case where the clearance is large, which is the range the broken line in FIG. 6 indicates.

The assembly procedure of the steering apparatus according to the first embodiment is described next referring to FIGS. 1 through 3. The bearing member 60 and the outer tube 22 are placed inside the main housing 10 such that the main housing 10 accommodates the bearing member 60 and the outer tube 22. The plate spring 40 and the thrust members 50 are arranged on the main housing 10 from the upward direction of the vehicle body 200, and then the plate spring 40 is connected to the main housing 10 with the bolts B, or similar connecting means. The plate spring 40 is connected to the main housing 10 so that a height of the plane where the plate spring 40 fixes to the main housing 10 is a distance, or length, indicated with X in FIG. 3. A distance expressed by X-Y in FIG. 3 is the height of the plate spring 40 compressed for providing the intended spring load.

Accordingly, connecting a sub-assembly, which is the plate spring 40 with the thrust members 50 assembled on the plate spring 40, to the main housing 10, which is accommodating the outer tube 22 and the bearing member 60, with bolts B, or similar connecting means, applies the intended thrust load on the outer tube 22. The flat surface portions 50a of the thrust members 50 are in contact with the flat surface portion 22a of the outer tube 22 in a state such that the thrust members 50 are thrusting the outer tube 22 in a direction toward the central axis of the outer tube 22 with the biasing force of the plate spring 40, so that a rotation of the outer tube 22 centering the axis of the outer tube 22 is reliably restricted. The bearing member 60 is arranged at a portion inside the main housing 10 in the downward direction of the vehicle body 200 in a state such that the bearing member 60 retains the outer tube 22 in an appropriate manner in a state where the peripheral portion in the downward side of the outer tube 22 and the inner wall of the bearing member 60 are in contact, so that the outer tube 22 slides smoothly in the axial direction.

A drive portion of the telescopic mechanism 2 is described next. As FIG. 2 illustrates, the steering apparatus according to the first embodiment is provided with an attachment 2a fixed to the outer tube 22 arranged in an opening 10c formed on the side wall 12 of the main housing 10 in a state to be movable in the axial direction, which is in the frontward and rearward direction of the vehicle body 200. The attachment 2a is made of metal and formed in a tubular form provided with a bottom portion. The attachment 2a is arranged such that the attachment 2a may contact a front end and a rear end of the opening 10c of the main housing 10. The bottom portion of the attachment 2a is connected to the side surface of the outer tube 22 by welding, or by a similar connecting method, at a portion in the frontward direction of the vehicle body 200 and a portion in the rearward direction of the vehicle body 200.

An electric motor 70 is retained to the main housing 10. An output shaft of the electric motor 70 is connected to the threaded shaft 72. A nut 73 that screws to the threaded shaft 72 is arranged within the attachment 2a. The nut 73 arranged within the attachment 2a moves in the axial direction on the threaded shaft 72 in response to the rotation of the threaded shaft 72 driven by the electric motor 70. Accordingly, the nut 73 and the attachment 2a move in the frontward and rearward direction of the vehicle body 200 together with the outer tube 22, the inner tube 21, the upper shaft 1a and the steering wheel 100. A reduction mechanism is provided between the output shaft of the electric motor 70 and the threaded shaft 72 so that an appropriately reduced output power of the electric motor 70 is transmitted to the threaded shaft 72. As FIG. 1 illustrates, the steering apparatus according to the first embodiment is provided with a tilt mechanism 3 at a position in the downward direction of the fixing bracket 30. The tilt mechanism 3 does not relate to the detailed description of the steering apparatus in this disclosure and describing the tilt mechanism 3 in detail is omitted.

In order to drive the telescopic mechanism 2 of the aforementioned configuration, the electric motor 70 is activated so that the output shaft of the electric motor 70 is driven to rotate. The rotation is reduced, or decelerated, through the reduction mechanism and transmitted to the threaded shaft 72, which in turn moves the nut 73 that screws to the threaded shaft 72 in the axial direction so that the outer tube 22 moves in the axial direction together with the attachment 2a that accommodates the nut 73. Along with the movement of the outer tube 22, the inner tube 21, the upper shaft 1a, and the steering wheel 100 move in the axial direction. By turning off the electric motor 70 in a state where the steering wheel 100 is at an intended position in the frontward and rearward direction of the vehicle, the steering wheel 100 is adjusted to the intended operation position.

The steering apparatus according to the first embodiment functions as the energy absorbing means. The energy, or a shock, is absorbed in a following manner. FIG. 3 illustrates a normal state of the steering apparatus. In a situation where the steering apparatus is applied with a load from rearward equal to or more than a predetermined amount on the steering wheel 100, the inner tube 21 integrally connected with the upper shaft 1a moves in the axial direction relative to the outer tube 22. In other words, the inner tube 21, together with the upper shaft 1a and the steering wheel 100, moves in the frontward direction from the position in the normal state FIG. 3 illustrates to a predetermined stop position. The aforementioned movement of the inner tube 21, the upper shaft 1a, and the steering wheel 100 works to absorb the shock on the steering wheel 100. In other words, in a case where the load greater than the predetermined load is applied on the steering wheel 100, the inner tube 21 is progressively accommodated into the outer tube 22, which moves the inner tube 21 in the frontward direction against the frictional force applied due to an annular frictional material provided between the inner tube 21 and the outer tube 22, so that the shock is absorbed.

Figure 7:
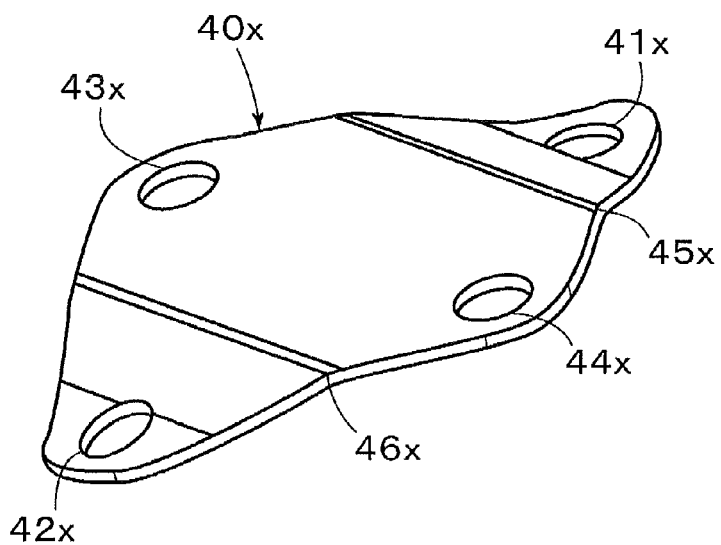
FIG. 7 is a perspective view illustrating another plate spring of the steering apparatus.
Figure 8:
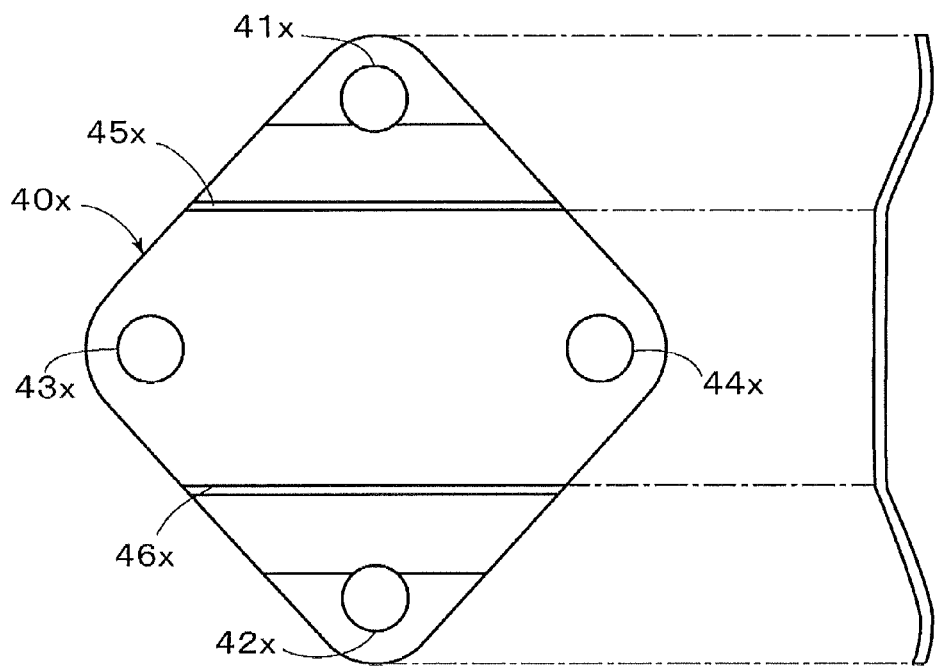
FIG. 8 is a top view and a side view of another plate spring of the steering apparatus.

FIGS. 7 and 8 illustrate another embodiment of the resilient member of the steering apparatus, which is the plate spring 40 in FIG. 1. A plate spring 40x, which serves as the resilient member, is formed in a substantially diamond shape, or in a quadrilateral having pairs of opposing corners perpendicular to each other, in top view. The plate spring 40x is provided with a pair of fixing portions 43x, 44x arranged at a pair of opposing corner portions of the substantially diamond shape and with a pair of thrust portions 41x, 42x arranged at the other pair of opposing corner portions. A bent portion 45x is formed between the fixing portions 43x, 44x and one of the thrust portions 41x, 42x, specifically, the thrust portion 41x. Another bent portion 46x is formed between the fixing portions 43x, 44x and the other one of the thrust portions 41x, 42x, specifically, the thrust portions 42x. Accordingly, as FIG. 8 illustrates, a level difference is formed between surfaces, each of which provided with the thrust portion 41x, 42x, and a surface provided with the fixing portions 43x, 44x, so that an intended thrust force is reliably applied. The plate spring 40x having a substantially diamond shape in top view is provided with a larger area around each of the fixing portions 43x, 44x compared with the plate spring 40 illustrated in FIG. 1. Accordingly, the plate spring 40x may reliably apply the intended thrust force even in a situation where the plate spring 40x is formed thinner than the plate spring 40, formed due to less material being used for forming the spring.

Figure 9:
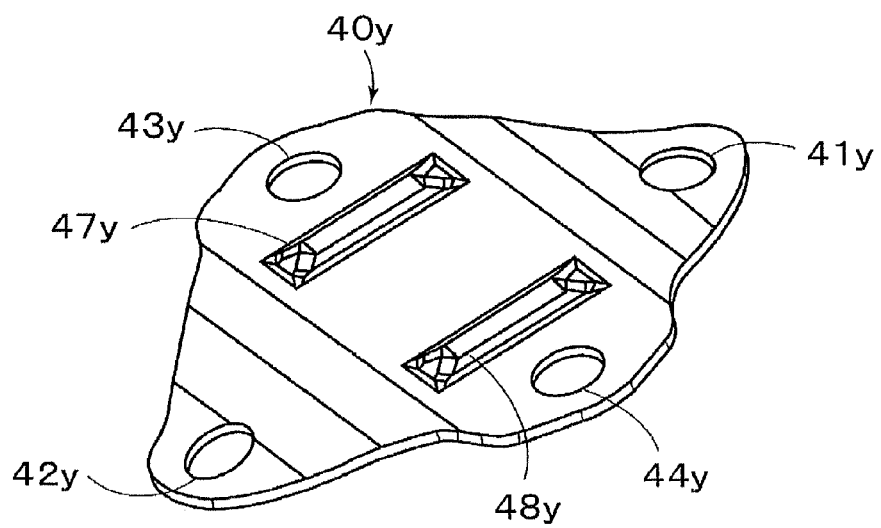
FIG. 9 is a perspective view illustrating yet another plate spring of the steering apparatus.
Figure 10:
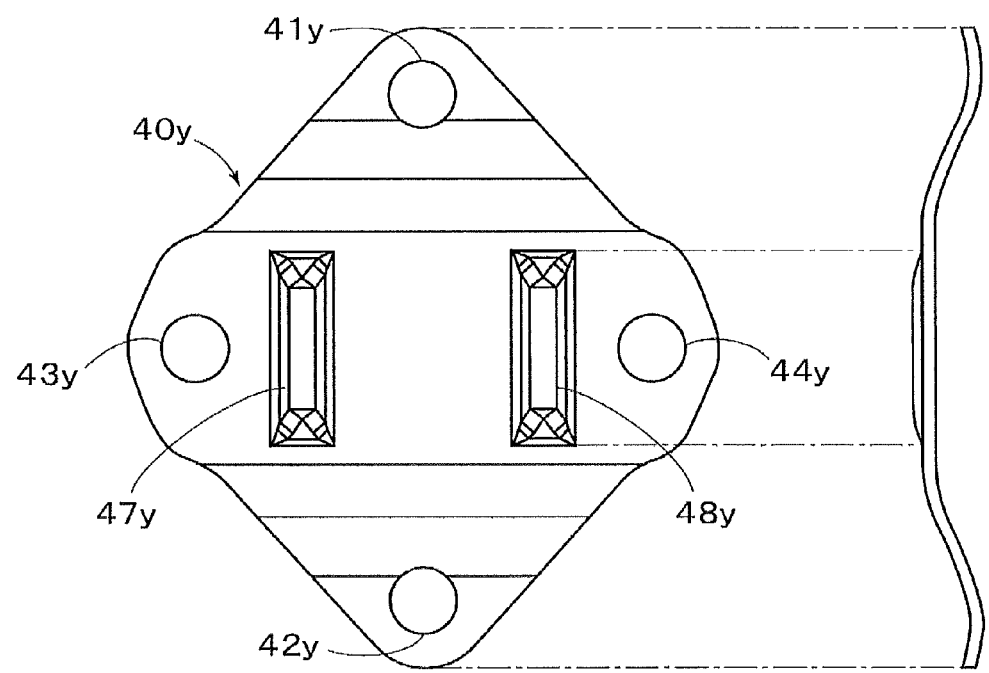
FIG. 10 is a top view and a side view of yet another plate spring of the steering apparatus.

FIGS. 9 and 10 illustrate yet another embodiment of the resilient member of the steering apparatus. A plate spring 40y, which serves as the resilient member, is provided with a pair of ribs 47y, 48y, each of which is formed in a rectangular form, on a surface provided with the fixing portions 43y, 44y. The ribs 47y, 48y are formed integrally with the plate spring 40y, formed at positions in parallel with the line connecting the centers of the thrust portions 41y, 42y. The ribs 47y, 48y are provided so that the plate spring 40y may reliably apply the intended thrust force even in a situation where the plate spring 40y is formed thinner than the plate spring 40, formed due to less material being used for forming the spring. In the plate spring 40y, the surface provided with the fixing portion 43y, 44y and surfaces, each of which provided with the thrust portion 41y, 42y, are smoothly continuous.

According to an aspect of this disclosure, the steering apparatus for the vehicle configured to adjust an operation position of the steering wheel 100 at least in the frontward and rearward direction of the vehicle body 200 includes the main housing 10 formed in the box form retained to the vehicle body 200, provided with the pair of side walls 11, 12 extending in the axial direction of the main housing 10 with the opening between the pair of side walls 11, 12, and provided with opening portions 10a, 10b at opposing ends in the axial direction. The steering apparatus also includes the movable column member 20 formed in the tubular form movably supported by the main housing 10 to be movable in the axial direction relative to the main housing 10, the movable column member 20 accommodated in the main housing 10 through one of the opening portions 10a, 10b at the opposing ends of the main housing 10 in the axial direction, the movable column member 20 being connected to the steering wheel 100. The steering apparatus further includes the plate spring 40, 40x, 40y formed in one piece provided with the pair of thrust portions 41, 42, 41x, 42x, 41y, 42y thrusting the movable column member 20 at positions separated by the predetermined separation distance in the axial direction and with the pair of fixing portions 43, 44, 43x, 44x, 43y, 44y fixing to end surfaces 11a, 12a of the pair of side walls 11, 12 at positions between the pair of thrust portions 41, 42, 41x, 42x, 41y, 42y in the axial direction. The plate spring 40, 40c, 40y configured to fix to the main housing 10 at the pair of fixing portions 43, 44, 43x, 44x, 43y, 44y is in the state where the pair of thrust portions 41, 42, 41x, 42x, 41y, 42y are thrusting the movable column member 20.

Accordingly, the steering apparatus is advantageous in preventing shakiness between the main housing 10 and the movable column member 20 with reduced number of components, with reduced cost, and with easier assembly procedure. The main housing 10 may be manufactured with metal diecast, which is effective in reducing the number of components, reducing cost, and improving ease of processing and assembly.

According to another aspect of this disclosure, the movable column member 20 of the steering apparatus is provided with the flat surface portion 22a that extends in the axial direction on the exterior surface of the movable column member 20 formed in the tubular form and is arranged in the state where the pair of thrust portions 41, 42, 41x, 42x, 41y, 42y of the plate spring 40, 40x, 40y is thrusting the flat surface portion 22a.

Accordingly, the steering apparatus is advantageous in easily and reliably preventing the rotation of the movable column member 20 with the axis of the movable column member 20 as center.

According to further aspect of this disclosure, each of the pair of thrust portions 41, 42, 41x, 42x, 41y, 42y of the plate spring 40, 40x, 40y of the steering apparatus is provided with the thrust member 50 that thrusts the flat surface portion 22a of the movable column member 20.

Accordingly, the steering apparatus is advantageous in reliably preventing shakiness between the main housing 10 and the movable column member 20 without uses of push nuts, snap rings, or similar components, so that the number of components is reduced.

According to another aspect of this disclosure, the plate spring 40, 40x, 40y of the steering apparatus is provided with the pair of fixing portions 43, 44, 43x, 44x, 43y, 44y and with the pair of thrust portions 41, 42, 41x, 42x, 41y, 42y, and each of the thrust members 50 is provided with the flat surface portion 50a that comes in contact with the flat surface portion 22a of the movable column member 20, the thrust member 50 provided in the floating support state on the plate spring constantly providing the plane contact of the flat surface portion 50a with the flat surface portion 22a of the movable column member 20 independently of the resilient deformation of the plate spring 40, 40x, 40y.

Accordingly, the steering apparatus is advantageous in reliably applying the intended thrust force with the plate spring 40, 40x, 40y in one piece instead of using the multiple number of coned disc springs, or similar components.

According to further aspect of this disclosure, the plate spring 40, 40x, 40y of the steering apparatus is provided with the diamond shape in top view, provided with the pair of fixing portions 43, 44, 43x, 44x, 43y, 44y at the pair of opposing corners of the diamond shape and with the pair of thrust portions 41, 42, 41x, 42x, 41y, 42y at the other pair of opposing corners of the diamond shape, and wherein the bent portion 45, 45x is formed between one of the pair of thrust portions 41, 41x and the pair of fixing portions 43, 44, 43x, 44x and another bent portion 46, 46x is formed between the other one of the pair of thrust portions 42, 42x and the pair of fixing portions 43, 44, 43x, 44x. The level difference is formed between a surface provided with the thrust portion 41, 42, 41x, 42x, 41y, 42y of the pair of thrust portions 41, 42, 41x, 42x, 41y, 42y and another surface provided with the pair of fixing portions 43, 44, 43x, 44x, 43y, 44y.

Accordingly, the steering apparatus is advantageous in reliably applying the intended thrust force even in the situation where the material for the plate spring 40, 40x, 40y is formed thinner with reduced amount of material for forming the spring, so that the resilient member is provided with reduced cost.

According to another aspect of this disclosure, the main housing 10 of the steering apparatus is provided with a larger size between the pair of side walls 11, 12 relative to the diameter of the movable column member 20 formed in the tubular form, and wherein the inner wall of the main housing 10 formed in the box form is provided with the curved surface fitting the exterior surface of the movable column member 20.

Accordingly, the steering apparatus is advantageous in that the movable column member 20 is easily assembled to the main housing 10 from the opening portion 10a, 10b of the main housing 10.

According to further aspect of this disclosure, the main housing 10 of the steering apparatus is provided with the cross-sectional shape obtained in the direction perpendicular to the axial direction, the cross-sectional shape in the U-shape while including the pair of side walls 11, 12.

Accordingly, the steering apparatus is advantageous in that the movable column member 20 is easily assembled to the main housing 10 from the opening portion 10a, 10b of the main housing 10.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering apparatus for a vehicle configured to adjust an operation position of a steering wheel at least in a frontward and rearward direction of a vehicle body, comprising:
a main housing formed in a box form retained to the vehicle body, provided with a pair of side walls extending in an axial direction of the main housing with an opening between the pair of side walls, and provided with opening portions at opposing ends in the axial direction;
a movable column member formed in a tubular form movably supported by the main housing to be movable in the axial direction relative to the main housing, the movable column member accommodated in the main housing through one of the opening portions at the opposing ends of the main housing in the axial direction, the movable column member being connected to the steering wheel;
a resilient member formed in one piece provided with a pair of thrust portions thrusting the movable column member at positions separated by a predetermined separation distance in the axial direction and with a pair of fixing portions fixing to end surfaces of the pair of side walls at positions between the pair of thrust portions in the axial direction; and
the resilient member configured to fix to the main housing at the pair of fixing portions in a state where the pair of thrust portions are thrusting the movable column member.

2. The steering apparatus for the vehicle according to claim 1, wherein the movable column member is provided with a first flat surface portion that extends in the axial direction on an exterior surface of the movable column member formed in the tubular form and is arranged in a state where the pair of thrust portions of the resilient member is thrusting the first flat surface portion.

3. The steering apparatus for the vehicle according to claim 2, wherein each of the pair of thrust portions of the resilient member is provided with a thrust member that thrusts the first flat surface portion of the movable column member.

4. The steering apparatus for the vehicle according to claim 3, wherein the resilient member is a plate spring provided with the pair of fixing portions and with the pair of thrust portions, and each of the thrust members is provided with a second flat surface portion that comes in contact with the first flat surface portion of the movable column member, the thrust member provided in a floating support state on the plate spring constantly providing a plane contact of the second flat surface portion with the first flat surface portion of the movable column member independently of a resilient deformation of the plate spring.

5. The steering apparatus for the vehicle according to claim 4, wherein the plate spring is provided with a diamond shape in top view, provided with the pair of fixing portions at a pair of opposing corners of the diamond shape and with the pair of thrust portions at the other pair of opposing corners of the diamond shape, and wherein a bent portion is formed between one of the pair of thrust portions and the pair of fixing portions, and another bent portion is formed between the other one of the pair of thrust portions and the pair of fixing portions, and wherein a level difference is formed between a surface provided with a thrust portion of the pair of thrust portions and another surface provided with the pair of fixing portions.

6. The steering apparatus for the vehicle according to claim 1, wherein the main housing is provided with a larger size between the pair of side walls relative to the diameter of the movable column member formed in the tubular form, and wherein an inner wall of the main housing formed in the box form is provided with a curved surface fitting the exterior surface of the movable column member.

7. The steering apparatus for the vehicle according to claim 6, wherein the main housing 10 is provided with a cross-sectional shape obtained in a direction perpendicular to the axial direction, the cross-sectional shape in a U-shape while including the pair of side walls.

* * * * *